(12) United States Patent
Faraone et al.

(10) Patent No.: US 8,587,495 B2
(45) Date of Patent: Nov. 19, 2013

(54) MULTIPLE-INPUT MULTIPLE-OUTPUT (MIMO) ANTENNA SYSTEM

(75) Inventors: Antonio Faraone, Fort Lauderdale, FL (US); Carlo DiNallo, Plantation, FL (US); Renato Cicchetti, Aprilia (IT)

(73) Assignee: Motorola Solutions, Inc., Schaumburg, IL (US)

( * ) Notice: Subject to any disclaimer, the term of this patent is extended or adjusted under 35 U.S.C. 154(b) by 392 days.

(21) Appl. No.: 12/962,354

(22) Filed: Dec. 7, 2010

(65) Prior Publication Data
US 2012/0139810 A1    Jun. 7, 2012

(51) Int. Cl.
*H01Q 1/50*    (2006.01)

(52) U.S. Cl.
USPC ............... 343/850; 343/853; 455/562.1

(58) Field of Classification Search
USPC ............ 343/700 MS, 702, 895, 850, 853; 455/562.1; 370/241; 375/219, 267
See application file for complete search history.

(56) References Cited

U.S. PATENT DOCUMENTS

| | | | |
|---|---|---|---|
| 6,052,093 A | 4/2000 | Yao et al. | |
| 6,140,972 A | 10/2000 | Johnston et al. | |
| 6,583,765 B1 | 6/2003 | Schamberger et al. | |
| 6,873,651 B2 * | 3/2005 | Tesfai et al. | 375/219 |
| 6,927,728 B2 | 8/2005 | Vook et al. | |
| 7,068,981 B2 * | 6/2006 | Sim | 455/101 |
| 7,079,870 B2 * | 7/2006 | Vaidyanathan | 455/562.1 |
| 7,099,678 B2 * | 8/2006 | Vaidyanathan | 455/500 |
| 7,248,645 B2 | 7/2007 | Vialle et al. | |
| 7,254,184 B2 * | 8/2007 | Buljore et al. | 375/299 |
| 7,308,287 B2 * | 12/2007 | Vaidyanathan | 455/562.1 |
| 7,406,067 B2 | 7/2008 | Deng et al. | |
| 7,457,590 B2 | 11/2008 | Frank | |
| 2002/0084943 A1 | 7/2002 | Tsai et al. | |
| 2002/0089456 A1 | 7/2002 | Hanada | |
| 2006/0220959 A1 | 10/2006 | Ying | |
| 2007/0123181 A1 | 5/2007 | Bit-Babik et al. | |
| 2007/0253508 A1 | 11/2007 | Zhou et al. | |

FOREIGN PATENT DOCUMENTS

EP    1788721 A2    5/2007

OTHER PUBLICATIONS

International Search Report and Written Opinion for International Patent Application No. PCT/US2011/063042 mailed Jun. 28, 2012.

* cited by examiner

*Primary Examiner* — Tan Ho
(74) *Attorney, Agent, or Firm* — Barbara R. Doutre (57) ABSTRACT

An antenna system includes a multi-port antenna with an active feeding network coupled thereto. The active feeding network applies complex weights to signals received from and transmitted to each port of the multi-port antenna. The complex weights are applied according to eigenvectors corresponding to a Hermitian matrix representation of the multi-port antenna. The Hermitian matrix may be based on such multi-port antenna parameters such as power dissipation, power radiation, real-power flow, volumetric storage of electromagnetic energy, and/or volumetric dissipation of electromagnetic energy. The multi-port antenna yields orthogonal electromagnetic fields in volumes or surfaces of interest in response to the active feeding network excitation.

31 Claims, 6 Drawing Sheets

MULTIPLE-INPUT MULTIPLE-OUTPUT (MIMO) ANTENNA SYSTEM

FIELD OF THE DISCLOSURE

The present disclosure relates generally to multiple-input multiple-output (MIMO) antenna systems and more particularly to a method and apparatus for optimizing efficiency and pattern correlation in MIMO antenna systems in fixed and portable communication devices.

BACKGROUND

Multiple-input multiple-output (MIMO) radio communication techniques increase the throughput of a communication system by taking advantage of multiple transmit and multiple receive antennas, which can be generally considered belonging to the class of multi-port antennas. MIMO methods use multi-port antennas having radiation patterns featuring low correlation. Low correlation may be a result of low electrical coupling between antenna ports. Presently, multi-port antenna systems for MIMO are designed by decoupling the antenna ports electrically, which is difficult and poses many geometrical and mechanical constraints, particularly in crowded and electrically small handsets. Antenna port decoupling approaches include separating antenna elements physically, placing antenna elements orthogonal to each other, or by feeding antenna element pairs in an even and odd fashion. However, all of these decoupling approaches place significant constraints on the handset ID, architecture, and mechanics. For instance, even/odd feeding is an effective means of decoupling antenna ports if the device hosting the antenna and the antenna elements feature substantially mirror-like symmetries. Furthermore, near-field coupling with the user's body disrupts symmetries. Additionally, implementing MIMO antenna systems under volume constraints makes it difficult to achieve proper antenna isolation.

Accordingly, there is need to improve the implementation of MIMO antenna systems for use in wireless communication devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, in accordance with various embodiments to be described herein, there is provided a multiple-input multiple-output (MIMO) antenna system realized by defining feeding profiles based on the eigenvectors of a suitable mathematical representation of the antenna system. The MIMO antenna system formed and operating in accordance with the various embodiments enhances system performance in terms of range and capacity (i.e. efficiency and data throughput), which in turn enhances system reliability and user experience.

In accordance with the various embodiments, a suitable matrix representation of the MIMO antenna system is employed to determine eigenvectors associated with the multiple antenna feeds. These "eigen-feed" configurations have the property of exciting uncorrelated "antenna modes" that have distinct efficiencies. The modes are uncorrelated regardless of the actual antenna elements geometries and their mutual coupling. By suitable transformation of the "eigen-feed" base, the "antenna modes" with a chosen degree of correlation may be synthesized. Applying the chosen eigen-feed excitations on the MIMO system enhances system capacity.

In accordance with various embodiments, the multi-port antenna is characterized by multi-port antenna parameters including scattering parameters; at least one of: real power flow, radiation, volumetric storage and/or power dissipation. The active feeding network includes transmitters and receivers for transmitting and receiving excitation signals through programmable gains and programmable time delays which allow for the application of complex weights to signals received from and transmitted to each port of the multi-port antenna. The complex weights are applied according to the eigenvectors corresponding to a Hermitian matrix representation of the multi-port antenna.

Figure 1:
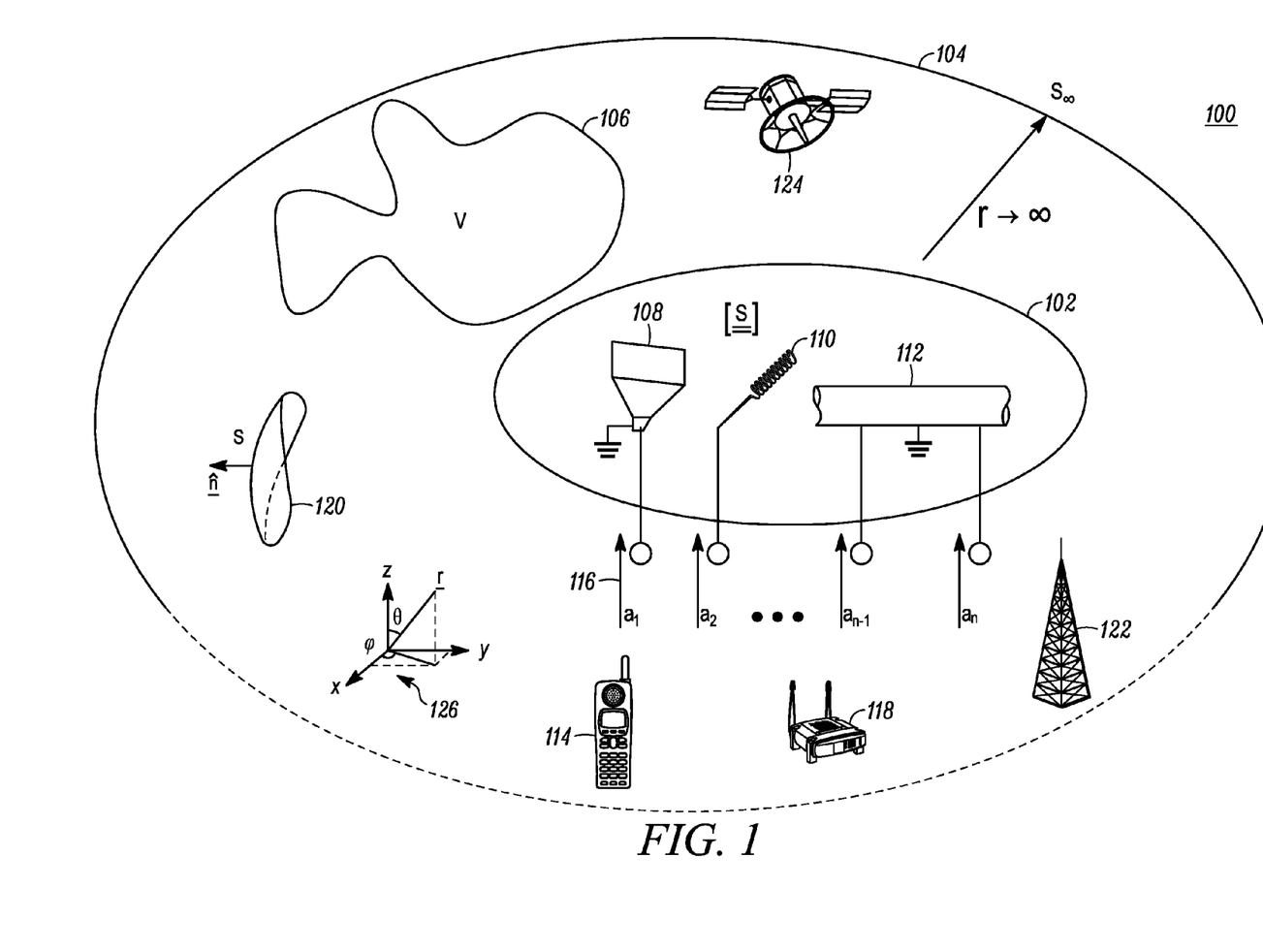
FIG. 1 is a diagram representing a multi-port antenna featuring a plurality of antenna elements operating in accordance with the various embodiments.

FIG. 1 is a diagram representing a communication system 100 in which devices incorporating a multi-port antenna system 102 having a plurality of antenna elements 108, 110, 112 operate. The plurality of antenna elements 108, 110, 112 may be coupled to portable and/or fixed communication devices 114, 118, 122 for example portable radio 114, mobile radio 118, tower or base station 122. The communication system 100 need not be limited to those communication devices shown in FIG. 1 and may include other communication devices such as space-borne devices or any communication device incorporating the multi-port antenna being described herein. For example, a constellation 124 may incorporate one ore more satellites having the multi-port antenna. The portable and fixed communication devices 114, 118, 122 each include controller, transmitter and receiver circuitry to provide communication over simplex, duplex or a combination of simplex and duplex operating modes. The controller further provides programmable functionality with which to control the application of excitation signals to the plurality of antenna elements 108, 110, 112. The communication system may further comprise additional mobile or fixed units with which the plurality of antenna elements 108, 110, 112 communicate, for example satellite constellation 124.

In accordance with various embodiments, the plurality of antenna elements 108, 110, 112 operate within a spatial surface 104 for operation with the communication devices 114, 118, 122 within a volume of interest 106 or through a surface of interest 120 in accordance with the various embodiments. Excitation signals in the form of incident-wave vectors $a_1$, $a_2 \ldots a_n$, are applied to the multi-port antenna system 102 as antenna feeds 116. The multi-port antenna system 102 may include single port antennas, multi-port antennas and combinations thereof. Examples shown include horn antenna element 108, helix antenna element 110, MIMO antenna element 112 and others are also possible. In accordance with the various embodiments, the multi-port antenna system 102 is excited in accordance with antenna port feeding profiles based on the eigenvectors of suitable mathematical representations of the multi-port antenna system 102. A suitable matrix representation of the multi-port antenna system 102 is employed (dissipation, radiation, real power flow, volumetric storage/dissipation matrix) to determine eigenvectors associated with the multiple antennas feeds 116. A global reference system 126 provides coordinates (x, y, z) for the communication devices 114, 116, 122 incorporating each multi-port antenna, provides coordinates (x, y, z) for points within the volume of interest 106, and provides coordinates (x, y, z) for points within the surface of interest 120. The global reference also provides directions identified by the coordinates ($\theta$, $\phi$). Within this application the term "coordinates" will identify points and directions.

The antenna feeds 116 are generated by active feeding networks operated by each communication device's controller. In accordance with an embodiment, a multi-port active feeding network applies, at each operating frequency, incident-wave eigenvector excitation signals corresponding to a Hermitian matrix representation of the multi-port antenna or combinations thereof. The Hermitian matrix representation is derived from predetermined multi-port antenna parameters. The Hermitian matrix representation yields orthogonal electromagnetic fields in volumes or surfaces of predetermined interest. The predetermined multi-port antenna parameters comprise at least one of: scattering parameters based on incident and reflected waves at the ports of the multi-port antenna comprising the antenna elements 108, 110, 112; power radiation at a surface at infinity ($S_\infty$) real-power flow through an arbitrary surface 120; volumetric energy storage in an arbitrary volume 106; and volumetric energy dissipation in an arbitrary volume 106. The Hermitian matrix representation of eigenvalues and eigenvectors may be computed periodically or in real-time based on information relative to a propagation channel as made available by the communication infrastructure in which devices 114, 118, 122 incorporating the multi-port antenna operate.

Allowed gain imbalance and the antenna port coupling are taken into account to realize "antenna modes" with a chosen degree of correlation or no correlation. The "eigen-feed" configurations excite uncorrelated "antenna modes" that have distinct efficiencies. The communication system 100 having antenna system 102 formed and operating in accordance with the various embodiments enhances system performance in terms of range and capacity (i.e. efficiency and data throughput), which in turn enhances system reliability and user experience.

Figure 2:
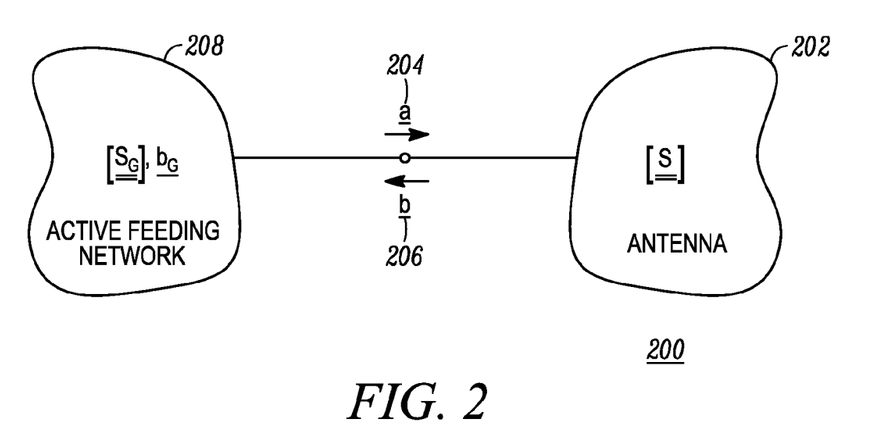
FIG. 2 is diagram of a multi-port antenna with active feeding network in accordance with various embodiments.
Figure 3:
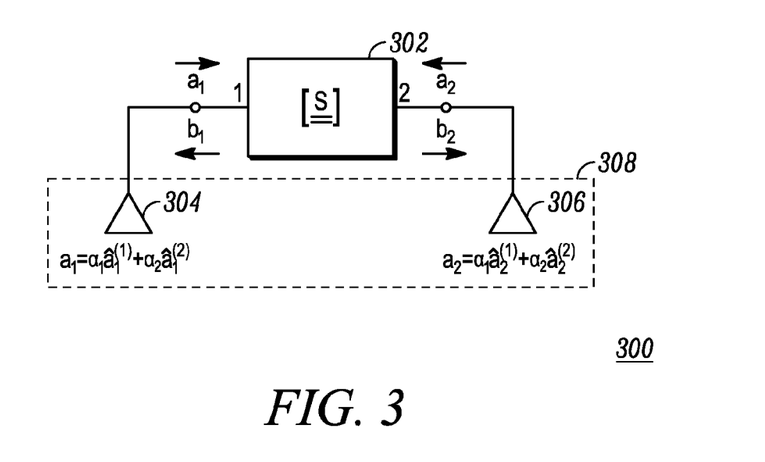
FIG. 3 is a two-port antenna with an active feeding network providing operative excitation consisting of a linear combination of incident-wave eigenvectors in accordance with various embodiments.
Figure 4:
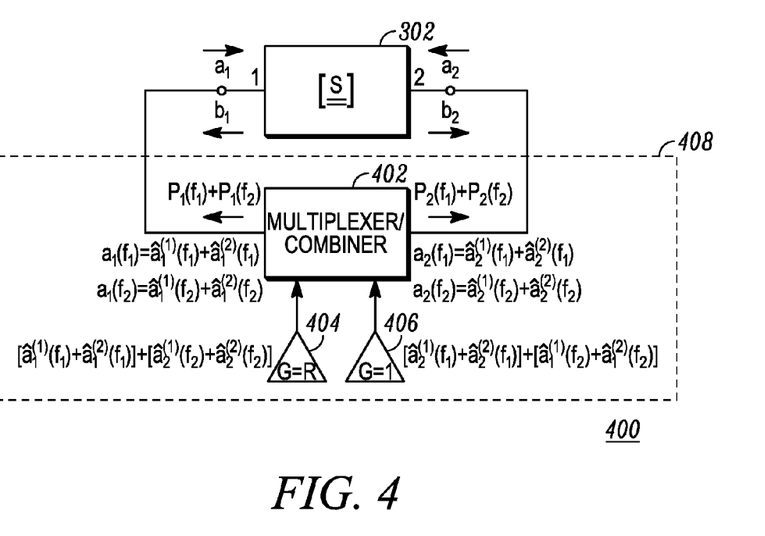
FIG. 4 is a two-port antenna featuring excitation signals derived from one higher-power amplifier and one lower-power amplifier for a MIMO application in accordance with various embodiments.
Figure 5:
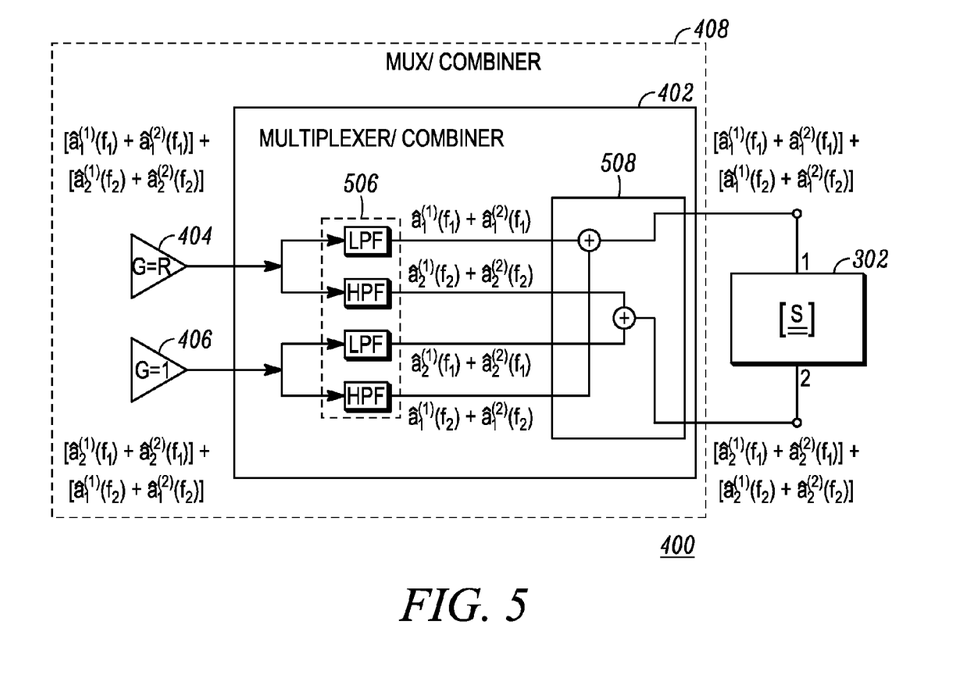
FIG. 5 is shows a two-port antenna with active feeding network in a MIMO application in accordance with the embodiment of FIG. 4.
Figure 6:
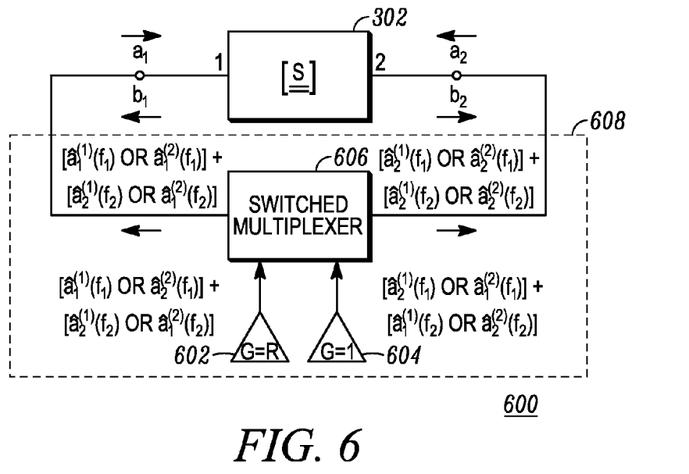
FIG. 6 is a diagram representing a two-port antenna with active feeding network operating in a diversity application in accordance with various embodiments.
Figure 7:
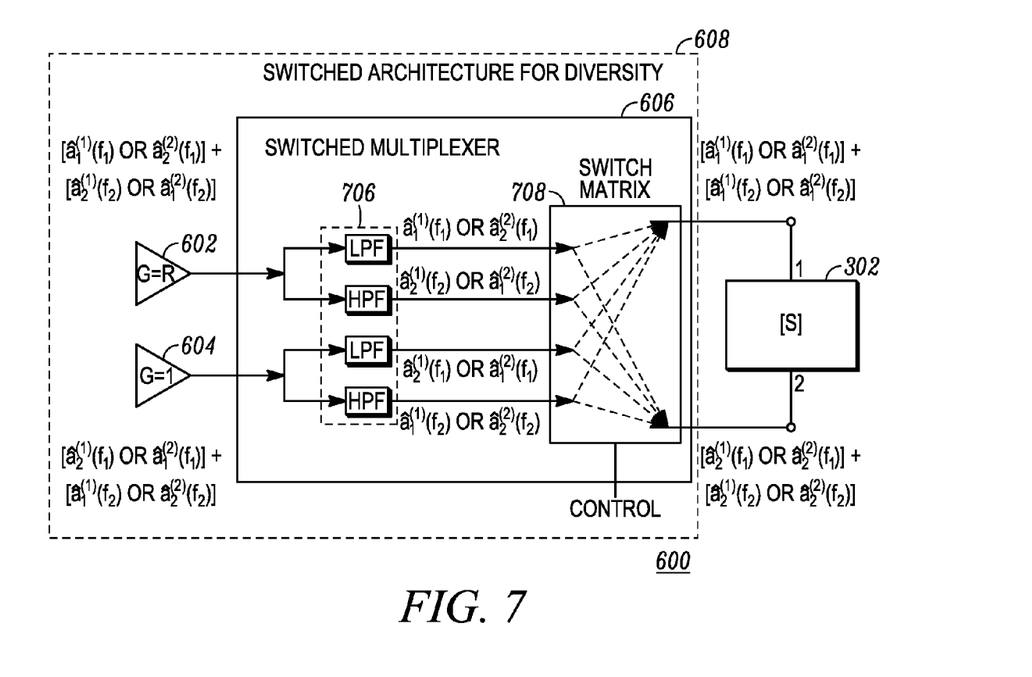
FIG. 7 is a diagram representing the two-port antenna with active feeding network operating in a diversity application in accordance with the embodiment of FIG. 6.
Figure 8:
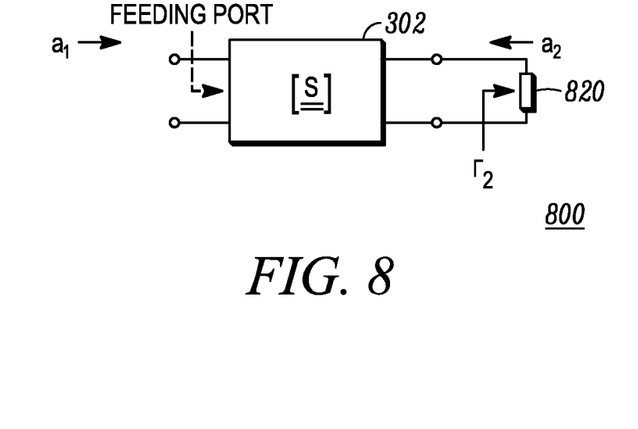
FIG. 8 shows a two-port antenna with active feeding network providing operative excitation in accordance with various embodiments.
Figure 11:
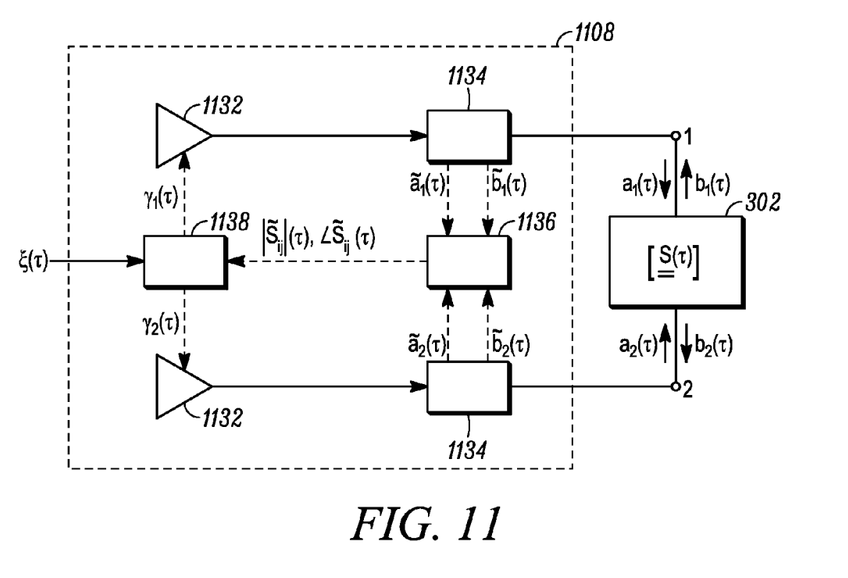
FIG. 11 is a diagram representing adaptability of the multi-port antenna operating in accordance with the various embodiments.

The following discussions are provided with examples of multi-port antennas, such as those shown in FIG. 1, optimum excitation of multi-port antennas in conjunction with FIG. 2, operative excitation of multi-port antennas in conjunction with FIGS. 3 and 8, application to MIMO antenna systems in conjunction with FIGS. 4 and 5, application to diversity antenna systems in conjunction with FIGS. 1, 9 and FIGS. 6, 7; and adaptivity in conjunction with FIG. 11.

Optimum Excitation of Multi-Port Antennas

FIG. 2 shows a network representation of a passive multi-port antenna structure 202, represented through its scattering matrix [S], excited and loaded by an active feeding network 208 represented through its scattering matrix [$S_G$] and its impressed-wave vector $b_G$ which represents the internal generators inside the active feeding network 208. The vector notation is associated to the multi-port antenna ports, so for instance if the antenna has n ports then the vector $b_G$ has n components, each representing the phasor of the impressed-wave emanating from each homonymous port of the active feeding network. Similarly, the aforementioned scattering matrices are complex-valued, with dimension n×n.

Using said vector notation, incident wave 204 (a) and reflected wave 206 (b), can be defined at the ports of the multi-port antenna structure starting from the homonymous vector voltages (v) and currents (i) at said ports. One possible definition (other, more general, ones are possible) is the following:

$$\underline{a} = \frac{1}{2\sqrt{R_0}}(\underline{v} + R_0\underline{i}), \quad \underline{b} = \frac{1}{2\sqrt{R_0}}(\underline{v} - R_0\underline{i})$$

where $R_0$ is an arbitrary positive resistance. Said waves have dimensions of the square root of power. For notation simplicity, the incident and reflected wave dimensions will be omitted in the following. The incident (a) and reflected (b) waves 204, 206 at the ports of the multi-port antenna 202 are related by the antenna scattering matrix as $$\underline{b} = [S] \cdot \underline{a},$$

and they are also related through the active feeding network 208 scattering parameters as $$\underline{a} = [S_G] \cdot \underline{b} + \underline{b}_G.$$

Therefore, the incident-wave vector into the multi-port antenna ports is univocally determined as $$\underline{a} = ([I] - [S_G] \cdot [S])^{-1} \cdot \underline{b}_G,$$

where [I] is the n×n-dimensional identity matrix. This equation shows that the incident-wave vector 204 is fully determined by the active feeding network 208. The equation can be readily inverted to determine the impressed-wave vector $\underline{b}_G$ required to yield a desired incident-wave vector. Depending on the application intended for the multi-port antenna 202, an optimum choice of the desired incident-wave vector $\underline{a}$ is performed by following one of the criteria outlined in the following. As a preliminary step towards the definition of the criteria for the optimum choice of the desired incident-wave vector $\underline{a}$, a set $\{\underline{F}_k\}$ of spatial field distributions (electric or magnetic fields, generically indicated with the symbol F) is defined, consisting of the fields produced within and outside the multi-port antenna structure 202 when the k-th port of the multi-port antenna is fed with a unitary incident wave $a_k=1$ while all the incident waves at the other ports are zero ($a_{j\neq k}=0$):

$$a_k=1, a_{j\neq k}0 \Rightarrow \underline{F}_k(r), k=1, \ldots, n,$$

where $r\equiv(x, y, z)$ is a generic observation point in space. When a generic incident-wave vector $\underline{a}$ is applied to the multi-port antenna, the corresponding field distribution is given by the linear combination of the fields $\{\underline{F}_k\}$ $$\underline{F}(r)=\Sigma_k a_k \underline{F}_k(r)=[\underline{F}_1(r)\underline{F}_2(r)\ldots\underline{F}_n(r)]\cdot\underline{a}.$$

Considering that the total power dissipated in the multi-port antenna (in the form of electromagnetic losses and radiated power) when a generic incident-wave vector $\underline{a}$ is applied to its ports is determined as $$W_d = \mathrm{Re}\left\{\frac{\underline{i}^+\cdot\underline{v}}{2}\right\} = \frac{\underline{a}^+\cdot\underline{a}-\underline{b}^+\cdot\underline{b}}{2} = \frac{1}{2}\underline{a}^+\cdot([\underline{I}]-[\underline{S}]^+\cdot[\underline{S}])\cdot\underline{a} = \frac{1}{2}\underline{a}^+\cdot[\underline{Q}_d]\cdot\underline{a},$$

where $[\underline{Q}_d]$ is a "dissipation matrix" and the symbol + denotes conjugate transpose, the objective of the optimum choice of the desired incident-wave vector $\underline{a}$ could be to maximize or minimize the power dissipated in the multi-port antenna, or to determine a set of incident-wave vectors $\{\underline{a}_h\}$ featuring desirable characteristics, for instance yielding orthogonal radiated fields according to a suitably defined scalar product between fields.

Considering that the total power radiated by the multi-port antenna 202 when a generic vector incident-wave $\underline{a}$ is applied to its ports is determined as $$W_{rad} = \frac{1}{2\eta_0}\int_{S_\infty} \underline{E}(r)^+\cdot\underline{E}(r)dS =$$

$$= \underline{a}^+\cdot\frac{1}{2\eta_0}\int_{S_\infty}\begin{bmatrix} \underline{E}_1(r)^*\cdot\underline{E}_1(r) & \cdots & \underline{E}_1(r)^*\cdot\underline{E}_n(r) \\ \vdots & \ddots & \vdots \\ \underline{E}_n(r)^*\cdot\underline{E}_1(r) & \cdots & \underline{E}_n(r)^*\cdot\underline{E}_n(r) \end{bmatrix} dS\cdot\underline{a} =$$

$$= \frac{1}{2}\underline{a}^+\cdot[\underline{Q}_{rad}]\cdot\underline{a},$$

where $[\underline{Q}_{rad}]$ is a "radiation matrix", E(r) is the electric field, the symbol * denotes the conjugate, $\overline{S}_\infty$ is the sphere at infinity, and $\eta_0$ is the plane-wave wave-impedance, the objective of the optimum choice of the desired incident-wave vector $\underline{a}$ could be to maximize or minimize the power radiated by the multi-port antenna, or to determine a set of incident-wave vectors $\{\underline{a}_h\}$ featuring desirable characteristics, for instance yielding orthogonal radiated fields according to a suitably defined scalar product between fields.

Considering that the real-power flow through a surface of interest S due to the fields produced by the multi-port antenna when a generic incident-wave vector $\underline{a}$ is applied to its ports is determined as $$W_S = \frac{1}{2}\int_S \mathrm{Re}\{\underline{E}(r)\times\underline{H}(r)^*\}\cdot\hat{n}dS$$

$$= \frac{1}{4}\int_S [\underline{E}(r)\times\underline{H}(r)^* + \underline{E}(r)^*\times\underline{H}(r)]\cdot\hat{n}dS =$$

$$= \frac{1}{2}\underline{a}^+\cdot[\underline{Q}_S]\cdot\underline{a},$$

where $[\underline{Q}_S]$ is a "real-power flow matrix", $\underline{E}(r)$ is the electric field, $\underline{H}(r)$ is the magnetic field, and $\hat{n}$ is the normal unit-vector to the surface S, the objective of the optimum choice of the desired incident-wave vector $\underline{a}$ could be to maximize or minimize the real-power flow through the surface S.

Considering that the total (electric or magnetic) energy stored (or the power dissipated) in a volume of interest V due to the fields produced by the multi-port antenna when a generic incident-wave vector $\underline{a}$ is applied to its ports is determined as $$W_V = \frac{1}{2}\int_V \kappa(r)\underline{F}(r)^+\cdot\underline{F}(r)dV =$$

$$= \underline{a}^+\cdot\frac{1}{2}\int_V \kappa(r)\begin{bmatrix} \underline{F}_1(r)^*\cdot\underline{F}_1(r) & \cdots & \underline{F}_1(r)^*\cdot\underline{F}_n(r) \\ \vdots & \ddots & \vdots \\ \underline{F}_n(r)^*\cdot\underline{F}_1(r) & \cdots & \underline{F}_n(r)^*\cdot\underline{F}_n(r) \end{bmatrix} dV\cdot\underline{a} =$$

$$= \frac{1}{2}\underline{a}^+\cdot[\underline{Q}_V]\cdot\underline{a},$$

where $[\underline{Q}_V]$ is a "volumetric storage (or dissipation) matrix", $\kappa(r)$ is the dielectric permittivity when electric energy storage is of interest (F=E), or the magnetic permeability when magnetic energy storage is of interest (F=H), or electrical conductivity when power dissipation is of interest (F=E), the objective of the optimum choice of the desired incident-wave vector $\underline{a}$ could be to maximize or minimize the energy stored (or the power dissipated) in the volume V, or to determine a set of incident-wave vectors $\{\underline{a}_h\}$ featuring desirable characteristics, for instance yielding orthogonal fields in the volume V according to a suitably defined scalar product between fields. It should be observed that the volume V may be chosen indefinitely thin so as to collapse to a mathematical surface or point, or combinations thereof. It should also be observed that when permittivity, permeability, or conductivity are tensors, the matrix $[\underline{Q}_V]$ can be computed by means of straightforward modifications to the expression of $W_V$.

In all the cases illustrated above, the quantity of interest (power or energy) is expressed as a function of the incident-wave vector $\underline{a}$ and a Hermitian matrix (reciprocal anisotropic media feature symmetrical permittivity, permeability, and conductivity tensors which render the matrix $[\underline{Q}_V]$ Hermitian). Therefore, the analytical treatment for the three cases can be formally unified by introducing a generic notation as $$W = \frac{1}{2}\underline{a}^+ \cdot [\underline{\underline{Q}}] \cdot \underline{a}$$

Since the n×n-dimensional matrix [Q] is Hermitian ([Q]=[Q]$^+$), it follows that its n eigenvalues are real numbers and its n eigenvectors are orthogonal (and can be made orthonormal) with respect to the Hermitian inner product. The set of eigenvalues $\{\lambda_i\}$ and orthonormal eigenvectors $\{\hat{\underline{a}}_i\}$ are related as follows:

$$[\underline{\underline{Q}}] \cdot \hat{\underline{a}}_i = \lambda_i \hat{\underline{a}}_i, \, i=1,\ldots,n \text{ with } \hat{\underline{a}}_i^+ \cdot \hat{\underline{a}}_j = \delta_{ij},$$

where $\delta_{ij}$ is the Kronecker delta. The matrix can be expressed in dyadic form as $$[\underline{\underline{Q}}] = \Sigma_i \lambda_i \hat{\underline{a}}_i \hat{\underline{a}}_i^+.$$

The generic incident-wave vector $\underline{a}$ is expressed in the base $\{\hat{\underline{a}}_i\}$ as $\underline{a} = \Sigma_i \alpha_i \hat{\underline{a}}_i$, thus $$W = \frac{1}{2}\underline{a}^+ \cdot [\underline{\underline{Q}}] \cdot \underline{a} = \frac{1}{2}\sum_i \lambda_i |\alpha_i|^2.$$

The available power at the antenna port is $$W_{av} = \frac{1}{2}\underline{a}^+ \cdot \underline{a} = \frac{1}{2}\sum_i |\alpha_i|^2,$$

therefore an efficiency figure $(\lambda_W)$ can be defined and calculated as follows $$\lambda_W = \frac{W}{W_{av}} = \frac{\underline{a}^+ \cdot [\underline{\underline{Q}}] \cdot \underline{a}}{\underline{a}^+ \cdot \underline{a}} = \sum_i \lambda_i |\hat{\underline{a}}_i^+ \cdot \hat{\underline{a}}|^2, \text{ where } \hat{\underline{a}} = \frac{\underline{a}}{|\underline{a}|}.$$

This equation shows that each eigenvalue represents the radiation efficiency associated with the corresponding eigenvector, thus the peak efficiency is attained when the incident-wave vector is equal to the multi-port antenna eigenvector with the highest eigenvalue since, due to the completeness relation $1 = \Sigma_i |\hat{\underline{a}}_i^+ \cdot \hat{\underline{a}}|^2$ and assuming the eigenvalues are arranged in decreasing order ($\lambda_1 \geq \lambda_2 \geq \ldots \geq \lambda_n$), the efficiency can be written as $$\lambda_W = \lambda_1 - \sum_{i>1}(\lambda_1 - \lambda_i)|\hat{\underline{a}}_i^+ \cdot \hat{\underline{a}}|^2 = \sum_{i<n}(\lambda_i - \lambda_n)|\hat{\underline{a}}_i^+ \cdot \hat{\underline{a}}|^2 + \lambda_n.$$

This equation shows that $\lambda_n \leq \lambda_W \leq \lambda_1$ for any possible incident-wave vector, assuming the maximum value $\lambda_1$ when $\hat{\underline{a}} = \hat{\underline{a}}_1$ and the minimum $(\lambda_n)$ for $\hat{\underline{a}} = \hat{\underline{a}}_n$. A noteworthy orthogonality property between the fields produced by the multi-port antenna for different incident-wave eigenvectors is readily demonstrated. Assuming that the multi-port antenna is excited using a linear combination of any two eigenvectors ($\underline{a} = \alpha_i \hat{\underline{a}}_i + \alpha_j \hat{\underline{a}}_j$), the resulting field distribution is the linear combination of the corresponding eigenfields $\underline{f}_i(r)$, $\underline{f}_j(r)$, yielding $F(r) = \alpha_i \underline{f}_i(r) + \alpha_j \underline{f}_j(r)$. Using the unified notation (assuming a lossless multi-port antenna in the case of the dissipation matrix $[Q_d]$), it follows $$W = \frac{1}{2}(\lambda_i|\alpha_i|^2 + \lambda_j|\alpha_j|^2)$$

$$= \frac{1}{2}\int_\Omega \chi(r) E(r)^+ \cdot E(r) d\Omega =$$

$$= \frac{1}{2}\int_\Omega \chi(r)\left[|\alpha_i|^2 |\underline{f}_i(r)|^2 + |\alpha_j|^2 |\underline{f}_j(r)|^2\right] d\Omega +$$

$$+ \text{Re}\left\{\alpha_i^* \alpha_j \int_\Omega \chi(r) \underline{f}_i(r)^+ \cdot \underline{f}_j(r) d\Omega\right\}$$

where $\Omega = S_\infty$, $\chi(r) = 1/\eta_0$, and $F = E$ for $[Q_d]$ and $[Q_{rad}]$, while $\Omega = V$ and $\chi(r) = \kappa(r)$ for $[Q_V]$. The only way for the above relation to hold for every $\alpha_i$, $\alpha_j$ is for the mixed-terms inner-product integral to vanish identically $$\int_\Omega \chi(r) \underline{f}_i(r)^+ \cdot \underline{f}_j(r) d\Omega \equiv 0,$$

demonstrating the orthogonality between the eigenfields of the multi-port antenna.

The integrals defining the matrices $[\underline{\underline{Q}}_{rad}]$, $[\underline{\underline{Q}}_S]$, and $[\underline{\underline{Q}}_V]$ can be modified to introduce a dependency on the propagation channel, the field polarization, and angular or spatial weighting, through a suitably defined "channel matrix" $[\underline{\underline{\Psi}}(r)]$ $$\left[\underline{\underline{Q}}_{rad}^\Psi(r)\right] = \frac{1}{\eta_0} \int_{S_\infty} [E_1(r)\ldots E_n(r)]^+ \cdot [\underline{\underline{\Psi}}(r)] \cdot [E_1(r)\ldots E_n(r)] dS,$$

$$\left[\underline{\underline{Q}}_V^\Psi(r)\right] = \int_V \kappa(r) [E_1(r)\ldots E_n(r)]^+ \cdot [\underline{\underline{\Psi}}(r)] \cdot [E_1(r)\ldots E_n(r)] dV,$$

$$\left[\underline{\underline{Q}}_S^\Psi(r)\right] = \int_S [E_1(r)\ldots E_n(r)]^+ \cdot [\underline{\underline{\Psi}}(r)] \cdot [E_1(r)\ldots E_n(r)] dS.$$

For the purposes of this application, the term channel matrix is used for the radiation, volumetric and surface cases as defined above. If $[\underline{\underline{\Psi}}(r)]$ is Hermitian then $[\underline{\underline{Q}}_{rad}^\Psi]$, $[\underline{\underline{Q}}_S^\Psi]$, and $[\underline{\underline{Q}}_V^\Psi]$ are also Hermitian, thus the noteworthy eigenfield properties demonstrated above hold, relative to the inner products defined through the above integrals featuring the channel matrix $[\underline{\underline{\Psi}}(r)]$ (for reciprocal anisotropic media featuring symmetrical permittivity, permeability, and conductivity tensors, generically indicated as $[\kappa(r)]$, the matrix $[\underline{\underline{Q}}_V^\Psi]$ is Hermitian if an Hermitian channel matrix is applied to both sides of $[\kappa(r)]$ as $[\underline{\underline{\Psi}}(r)]^+ \cdot [\kappa(r)] \cdot [\underline{\underline{\Psi}}(r)]$). In the case of $[\underline{\underline{Q}}_{rad}^\Psi]$, upon expressing the fields in spherical coordinates $(\bar{r}, \theta, \phi)$, where $\theta, \phi$ are observation angles, a possible expression for the channel matrix which preserves the mentioned properties is $$[\underline{\underline{\psi}}(\theta, \varphi)] = \begin{bmatrix} \psi_{\theta\theta}(\theta, \varphi) & \psi_{\theta\varphi}(\theta, \varphi) \\ \psi_{\theta\varphi}(\theta, \varphi)^* & \psi_{\varphi\varphi}(\theta, \varphi) \end{bmatrix} w(\theta, \varphi),$$

with $\psi_{\theta\theta}, \psi_{\theta\theta}, \omega \in \Re \geq 0$, where $w(\theta, \phi)$ is an angular weighting function expressing the dependency on the observation angles. A matrix with such properties can be obtained, for instance, as $[\underline{\underline{\psi}}] = w\underline{p}^+\underline{p}$ with $\underline{p}(\theta,\phi) = [p_\theta(\theta,\phi) \, p_\phi(\theta,\phi)]$. Similarly, in the case of $[Q_S^\Psi]$ or $[Q_V^\Psi]$, upon expressing the fields in Cartesian coordinates (x, y, z), a possible expression for the channel matrix which preserves the mentioned properties is $$[\underline{\underline{\psi}}(x,y,z)] = \begin{bmatrix} \psi_{xx}(x,y,z) & \psi_{xy}(x,y,z) & \psi_{xz}(x,y,z) \\ \psi_{xy}(x,y,z)^* & \psi_{yy}(x,y,z) & \psi_{yz}(x,y,z) \\ \psi_{xz}(x,y,z)^* & \psi_{yz}(x,y,z)^* & \psi_{zz}(x,y,z) \end{bmatrix} w(x,y,z),$$

with $\psi_{xx}, \psi_{yy}, \psi_{zz}, w \in \Re \geq 0$.

where w(x, y, z) is a spatial weighting function. A matrix with such properties can be obtained, for instance, as $[\psi]=w\ p^+p$ with $p(x,y,z)=[p_x(x,y,z)\ p_y(x,y,z)\ p_z(x,y,z)]$. One possible definition of the weighting function w(x, y, z) involves the weighted sampling of a set of points $\{r_h \equiv (x_h, y_h, z_h)\}$ $$w(r) = \Sigma_h w_h \delta(r - r_h)$$

where $\{w_h\}$ is the set of weighting coefficients and $\delta$ is the Dirac delta function. An analogous definition for the angular weighting function w ($\theta$, $\phi$), where the weighted sampling involves a set of directions $\{(\theta_h, \phi_h)\}$, can be derived as $$w(\theta,\phi) = \Sigma_h w_h \delta(\theta-\theta_h, \phi-\phi_h)$$

The set of directions can be associated with one or more fixed and/or mobile transceivers that communicate with the communication device incorporating the multi-port antenna. For example, the set of directions $\{(\theta_h, \phi_h)\}$ could be associated to a constellation of transceiving satellites whose fixed or variable positions may be known a-priori or through available estimates provided, for instance, by the infrastructure within which the device incorporating the multi-port antenna operates, where said estimates would also take into account changes of the orientation and position of the multi-port antenna relative on a global reference frame as measured with compasses, accelerometers, or equivalent means including assisted or unassisted Global Positioning System (GPS) or equivalent estimates. In this case, said set of directions and the relative weights, indicated as $\{(\theta_h, \phi_h)|\tau\}$ and $\{w_h(\tau)\}$, respectively, could be a function of time $\tau$, thus requiring periodical updates of the channel matrix, the corresponding radiation matrix and the relative eigenvalues and eigenvectors. For instance, some of the weights $w_h(\tau)$ could be set to zero unless their associated satellites are estimated to be above the horizon. Many other variations of w(x, y, z) and w($\theta$, $\phi$) are possible, including the superposition of piecewise continuous and weighted-sampling functions. For instance, the weighting function w(x, y, z) could be the superposition of a volume enclosing the base-station antenna, and a set of points representing the location of mobile terminals (which could be estimated upon mutual sharing of GPS location information). Also in this case, the weighting function may depend on time $\tau$, for instance due to varying positions of the tracked points $\{r_h|\tau\}$ relative to the multi-port antenna (as measured with compasses, accelerometers, or equivalent means including assisted or unassisted GPS or equivalent estimates, or known a-priori or through available estimates provided, for instance, by the infrastructure within which the device incorporating the multi-port antenna operates), or due to changing location or shape of the piece-wise continuous volume, or both. This approach could be advantageous in wireless communication systems employing cooperating fixed and mobile terminals, as in so-called "mesh networks".

Operative Excitation of Multi-Port Antennas

Once a given incident-wave eigenvector or a linear combination thereof, generally indicated with $\underline{a}$, is chosen to excite the multi-port antenna structure, it is always possible to determine an impressed-wave vector $\underline{b}_G$ which excites such an incident-wave vector at the antenna port as $$\underline{b}_G = ([\underline{\underline{I}}] - [\underline{\underline{S}}_G] \cdot [\underline{\underline{S}}]) \cdot \underline{a},$$

This means that the complex amplitudes of the internal generators inside the active feeding network need to be set to specific values depending on the desired incident-wave vector a and the correspondingly required impressed-wave vector $\underline{b}_G$. In general, all the impressed-wave vector components will be non-zero, meaning that all the ports of the active feeding network will generate RF power to energize the multi-port antenna and realize the desired field distribution. This situation is exemplified in FIG. 3, where an active feeding network 308 provides excitations, consisting of a linear combination of incident-wave eigenvectors, at all the ports of a multi-port antenna 302. In this example, the active feeedging network 308 includes power amplifier 304 coupled to port 1 and power amplifier 306 coupled at port 2. In some cases, for example to reduce the number of RF power amplifiers 304, 306, it could be advantageous to reduce the number of active feeding network ports that supply energy to the multi-port antenna. One possible way to accomplish this is to enforce that some of the components of the impressed-wave vector $\underline{b}_G$ be null. This condition translates in the following condition on the scattering matrix $[\underline{\underline{S}}_G]$ of the feeding network $$[\underline{\underline{S}}_G] \cdot ([\underline{\underline{S}}] \cdot \underline{a}) = \underline{a} - \underline{b}_G,$$

which admits infinite solutions $[\underline{\underline{S}}_G]$ for any $[\underline{\underline{S}}], \underline{a}, \underline{b}_G$. This flexibility in synthesizing the matrix $[\underline{\underline{S}}_G]$ allows the designer to implement advantageous solutions, for instance the choice of a reciprocal, passive structure (excluding the internal generators), which corresponds to introducing the constraint that $[\underline{\underline{S}}_G]$ be symmetrical with all its elements not greater than unity in magnitude. Another possible approach consists in decoupling all the ports of the active feeding network by choosing $$[\underline{\underline{S}}_G] = [\underline{\underline{\Gamma}}_G] = [\text{diag}\{\Gamma_1, \ldots, \Gamma_n\}]$$

In this case, the load required at any i-th port where vanishing of the impressed-wave is desired ($b_{G_i}=0$) must feature the following reflection coefficient $$\Gamma_i = \frac{a_i}{\sum_j S_{ij} a_j}$$

where $S_{ij}$ are the scattering parameters of the multi-port antenna. It is clear that the load value has to be programmed to a specific setting for any desired incident-wave vector a. In theory, it is possible to realize any incident-wave vector $\underline{a}$ by feeding the multi-port antenna at one port only, for instance port 1, and loading all other ports as just described, by choosing $$\Gamma_1 = \frac{a_1 - b_{G_1}}{\sum_j S_{1j} a_j}$$

This approach is exemplified in FIG. 8, where the multi-port antenna 302 is fed at one port and loaded at a second port by a load impedance 820 in order to realize the required reflection coefficient $\Gamma_2$ yielding a desired incident-wave vector. Choosing $\Gamma_1=0$ (generator with internal impedance $R_0$) yields $b_{G_1}=a_1$.

Removing the mentioned constraints on the matrix $[S_G]$ further enhances the designer freedom, for instance as was shown in FIG. 3 by allowing the multi-port antenna 302 to interface with an active feeding network 308 comprising amplifiers 304, 306, or with an active feeding network comprising distributed amplifiers featuring multiple amplifying stages with variable gains and variable-delay lines in-between, or other, more general, network topologies. In this case, the amplitudes of the internal sources as well as the amplifiers gains and delays would have to be programmed to specific settings for each of the required states of $[S_G]$, $b_G$ corresponding to each desired incident-wave vector $\bar{a}$.

Application to MIMO Antenna Systems

The use of space-time coding in MIMO communication systems involves spatial multiplexing techniques to transmit multiple uncorrelated signals through uncorrelated propagation channels. The most straightforward implementation of these techniques involves sending different uncorrelated signals to different antennas exhibiting uncorrelated radiation patterns according to an inner product definition suitable for the specific application. For instance, antenna elements spaced more than one wavelength apart from each other exhibit uncorrelated patterns over the $S_\infty$ domain. Another instance is when two antenna elements have orthogonal polarizations. Antenna arrays with either or both these features are frequently employed in base stations using MIMO antenna techniques.

Portable radios do not typically allow placing antenna elements at large electrical distances from each other, or to readily achieve polarization orthogonality, thus making much more challenging to achieve uncorrelated patterns and reducing the processing gain (and data throughput) achievable by simply feeding different uncorrelated signals to distinct antenna elements. However, the use of different incident-wave eigenvector excitations, defined according to one of the aforementioned representations, to carry distinct uncorrelated signals allows achieving uncorrelated patterns even when the radiating structure features significant correlation between the fields excited from each port separately. This is accomplished by associating one eigenvector to each uncorrelated signal and feeding simultaneously all signals, weighted by the corresponding eigenvector components, to all ports of the multi-port antenna. For instance, using phasors and assuming ergodicity for phase-modulated signals, each signal can be represented as $$\zeta_i = A_i e^{j\phi_i},$$

where $A_i$ and $\phi_i$ are stochastic variables, the latter having zero-mean and uniform distribution in $[-\pi, \pi)$. Thus, the incident-wave vector applied to the multi-port antenna is $a = \Sigma_h \zeta_h \hat{a}_h$. Because the signals are uncorrelated, the average forward power into the i-th port ($W_i^f$) is the sum of the power from each signal weighted by the i-th component of the corresponding eigenvector $$W_i^f = E\left\{\frac{1}{2}|a_i|^2\right\} = \frac{1}{2}\sum_h \sum_k E\{A_h A_k\} \hat{a}_i^{(h)*} \hat{a}_i^{(k)} E\{e^{j(\phi_k - \phi_h)}\} =$$
$$= \frac{1}{2}\sum_h \sum_k E\{A_h A_k\} \hat{a}_i^{(h)*} \hat{a}_i^{(k)} \delta_{hk} = \frac{1}{2}\sum_h E\{A_h^2\}|\hat{a}_i^{(h)}|^2$$
$$= \frac{1}{2}\sum_h (W_\zeta)_h |\hat{a}_i^{(h)}|^2,$$

where $\hat{a}_i^{(h)}$ is the i-th component of the eigenvector associated to $\zeta^h$, and $(W_\zeta)_h$ is the average power of $\zeta_h$ which is typically set adaptively following periodical or real-time directions from the network. The system in FIG. 3, featuring separate transmitters 304 and 306 for each port injecting a linear combination of eigenvector components (where $\alpha_h = \zeta_h$, h=1, 2), enables the implementation described in the foregoing. More in general, a transceiver would be typically connected to each port so as to operate the MIMO antenna system in transmission and reception (baseband processing can be employed to apply the required eigenvector weights to the received port signals after suitable decoding).

The transmit MIMO architecture in FIG. 3 would typically require equally-rated power amplifiers at each port of the multi-port antenna. This can represent a challenge in portable wireless applications since having multiple high-power amplifiers increases battery current drain, product cost, heat dissipation requirements, and the required volume. Therefore, it would be useful to define alternative architectures that avoid multiple equally-rated high-power amplifiers. One possible architecture that achieves the stated objective is illustrated in FIG. 4, for instance in the case of the two-port antenna 302. Such an architecture, featuring one high-power amplifier 404 and one low-power amplifier 406, builds on the hypothesis that the multi-port antenna eigenvector components exhibit certain magnitude ratios, as exemplified in the following, in each operating band of the device. In the example provided, it is assumed that the multi-port antenna 302 has been designed so as to feature the following relationships between the average powers associated to the eigenvector components in the operating bands identified by the respective carrier frequencies $f_1$ and $f_2$:

$$\frac{P_1(f_1)}{P_1(f_2)} = \frac{|\hat{a}_1^{(1)}(f_1)|^2 + |\hat{a}_1^{(2)}(f_1)|^2}{|\hat{a}_1^{(1)}(f_2)|^2 + |\hat{a}_1^{(2)}(f_2)|^2} > R \text{ and}$$

$$\frac{P_2(f_2)}{P_2(f_1)} = \frac{|\hat{a}_2^{(1)}(f_2)|^2 + |\hat{a}_2^{(2)}(f_2)|^2}{|\hat{a}_2^{(1)}(f_1)|^2 + |\hat{a}_2^{(2)}(f_1)|^2} > R.$$

This condition implies that when the uncorrelated signals are transmitted within each band at the respective maximum average-power level, the average RF power flowing towards port 1 in the band $f_1$ is significantly higher than the average RF power flowing towards port 1 in the band $f_2$, while the average RF power flowing towards port 2 in the band $f_2$ is significantly higher than the average RF power flowing towards port 2 in the band $f_1$. For simplicity, the foregoing condition assumes that all signals have unitary maximum average-power level even though it is typically different in each band, and employs the same ratio R for both ports even though in general the ratio may be different for each port and each band, requiring, in such more general cases, straightforward modifications to the stated condition. It is also assumed that the total power flowing into the multi-port antenna at each frequency band be bounded. The ratio R is greater, and should possibly be significantly greater, than unity. For instance, a ratio R greater than 2 is achievable with only a ratio greater than 1.42 between $|\hat{a}_1^{(1)}(f_1)|$ and $|\hat{a}_1^{(1)}(f_2)|$, $|\hat{a}_1^{(2)}(f_1)|$ and $|\hat{a}_1^{(2)}(f_2)|$, $|\hat{a}_2^{(1)}(f_2)|$ and $|\hat{a}_2^{(1)}(f_2)|$ and $|\hat{a}_2^{(2)}(f_1)|$, and would allow using a lower-power amplifier 406 with half the gain of the higher-power amplifier 404 (for simplicity, amplifiers with flat gains versus frequency are assumed). Following this approach, the ratio R corresponds to the ratio between the power gains required for the two amplifiers. It should be appreciated that using half the gain in each of the two bands implies that the lower-power amplifier 406 would be required to generate one-fourth of the total RF power that the higher-power amplifier 404 would be required to generate. If three frequency bands were used, then the ratio between the maximum output power levels required by each amplifier would be one-eight, and so on.

The architecture in FIG. 4 features a "multiplexer/combiner" 402 within an active feeding network 408, which serves the function of separating the signals in the different bands and suitably combining those intended to be applied to each port of the multi-port antenna. One possible implementation of the multiplexer/combiner 402 is illustrated in FIG. 5, where the outputs of the power amplifiers 404, 406 are sent through banks of low-pass filters (LPF) and high-pass filters (HPF) (a band-pass filter can also be employed in lieu of a HPF) 506 to separate the signals in the frequency domain (assuming $f_1 < f_2$), and the filter outputs are then suitably combined to be sent to the appropriate antenna ports though combining circuitry 508. Alternatively, the frequency separation is effected using a single diplexing device after each power amplifier.

Application to Diversity Antenna Systems

The full MIMO capability described in the foregoing may not necessarily be required in all wireless communication applications. In some instances, it is preferable to employ transmit diversity on one end of the communication link, especially when the data throughput is asymmetric. For instance, mobile data applications may frequently require larger data throughputs in the down-link (base station to mobile terminal) rather than in the up-link (mobile terminal to base station). In these cases, spatial multiplexing may be the appropriate choice on the base station side, while transmit diversity may be the appropriate choice on the mobile terminal side of the communication link.

Figure 9:
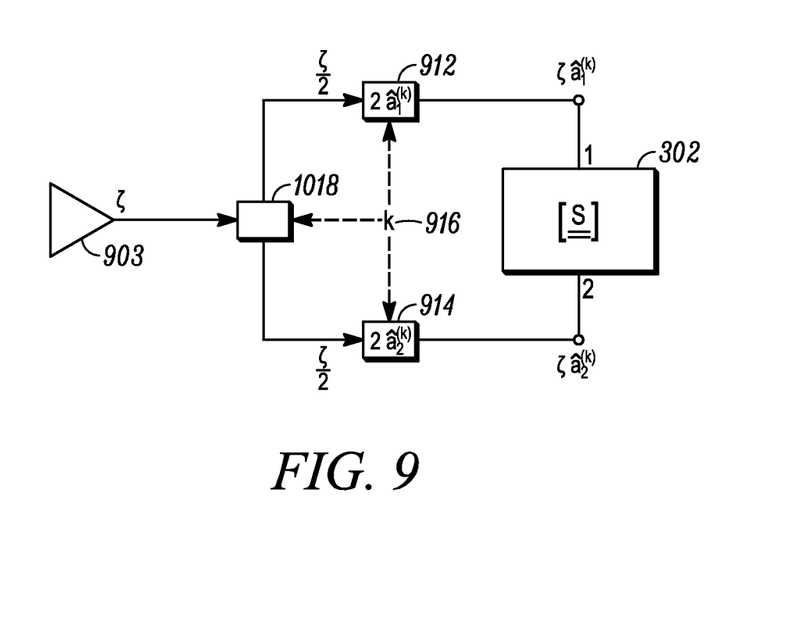
FIG. 9 is a diagram representing the multi-port antenna with active feeding network operating in a diversity application in accordance with the various embodiments.

Transmit diversity schemes take advantage of the low correlation between antenna patterns. For instance, in a multi-antenna system, a signal can be sent to only one of the antennas at any given time, where the antenna selection is based on suitable algorithms designed to optimize the system performance, e.g., data throughput. Multiple uncorrelated antenna patterns can be difficult to realize in a portable communication devices of a physical size comparable to the wavelength. Therefore the use of multi-port antenna structures and corresponding eigenvector excitations based on a chosen representation of the radiating structure (for instance, based on the [$\underline{\underline{Q}}_{rad}^{\Psi}$] matrix) represents an advantageous design choice since it always allows synthesizing orthogonal radiation patterns. According to this approach, the incident-wave vector applied to the ports of the multi-port antenna at any given time is determined multiplying the signal to be transmitted ($\zeta$) by one of the multi-port antenna eigenvectors: $\underline{a} = \zeta \underline{\hat{a}}_r$. The architecture in FIG. 9 represents a possible way to realize such an embodiment for a two-port antenna 302 operating in a transmit diversity system over a single frequency band. In this architecture, the amplified signal $\zeta$ with average power $W_\zeta$ is split and then weighted by the k-th eigenvector components (doubled so as to restore the total average power $W_\zeta$ at the antenna ports). The circuits 912 and 914 that implement signal weighting may comprise programmable amplifiers and/or attenuators to set the required magnitude, as well as programmable delay lines to set the required phase. These programmable devices are controlled by signal 916 selecting the appropriate eigenvector parameters. Alternatively, rather than an equal split of the amplified signal $\zeta$, the architecture could comprise a programmable power splitter 918 providing the required magnitude imbalance between the port signals, eliminating the need for amplifiers and/or attenuators in 912 and 914. Extending this architecture to the case when transmit diversity is employed in multiple frequency bands for two different signals $\zeta_{f_1}, \zeta_{f_2}$, identified by the respective carrier frequencies $f_1, f_2$, can be accomplished using the architecture in FIG. 10, which includes a diplexing device 1005, comprising a LPF and a HPF, followed by the splitting/weighting blocks [1118 (splitting)/1012, 1014, 1022, 1024 (weighting)] and then combiners that route the appropriate signals to the respective ports. In this case, the control circuitry 1016 and 1026 provides for the selection of the appropriate eigenvector parameters, at any given time, in each frequency band.

Figure 10:
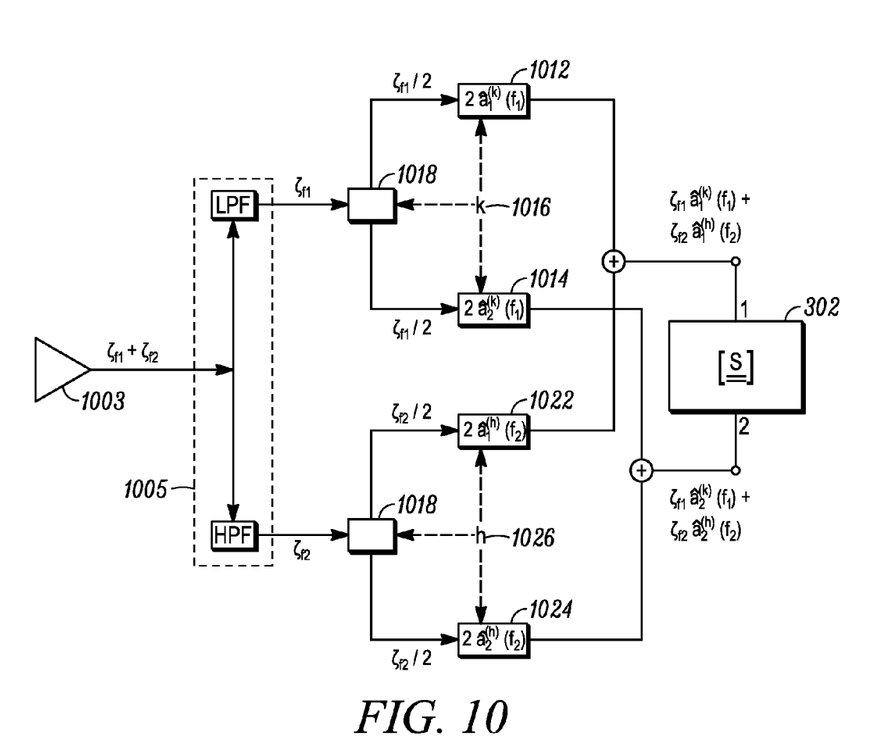
FIG. 10 is a diagram representing the multi-port antenna with active feeding network operating in a diversity application in multiple frequency bands in accordance with the various embodiments.

The architectures in FIG. 9 and FIG. 10 provide flexibility in the choice of the signal amplification architecture. When the splitters 918 and 1018 are designed to split the signals evenly along two branches, the weighting functions require the use of a programmable amplifier or a programmable attenuator. The former case is more advantageous from an energetic viewpoint since it does not require wasting RF power but it comes with the additional cost of requiring in-line power amplifiers within 912, 914, 1012, 1014, 1022, and 1024; indeed, this architecture would present the advantage of not requiring any high-power amplifiers if a medium-power pre-amplifier 903, 1003 is followed by medium-power final amplifiers within 912, 914, 1012, 1014, 1022, and 1024. When the splitters 918 and 1018 are designed to split the signals unevenly, according to programmed settings controlled by signals 916, 1016, and 1026, to realize the weight imbalance corresponding to the chosen eigenvector in each frequency band, the complexity required to implement said programmable splitters may be compensated by the advantage to be able to use a single high-power amplifier 903, 1003.

The foregoing architectures implement transmit diversity by requiring the use of programmable delay lines, amplification stages, or uneven power splitters. A possible tradeoff which eliminates much of the complexity of the foregoing implementation could be based on the simpler architecture in FIG. 3, where each port of the multi-port antenna features its own transmitter. Transmit diversity is implemented by synthesizing the weighted signals for each port by applying within baseband processing the complex weights associated to the chosen eigenvector in each band. This approach, however, requires the use of two high-power RF amplifiers which, as previously discussed, may result in significant challenges for portable wireless communication devices. Therefore, it would be useful to define alternative architectures that avoid multiple equally-rated high-power amplifiers. One possible architecture that achieves the stated objective is illustrated in FIG. 6, for instance in the case of a two-port antenna 302. Such an architecture, featuring one high-power amplifier 602 and one low-power amplifier 604, builds on the hypothesis that the multi-port antenna eigenvector components exhibit certain magnitude ratios, as exemplified in the following, in each operating band of the device. In the example provided, it is assumed that the multi-port antenna 302 has been designed so as to feature the following relationships between the average powers associated to the eigenvector components in the operating bands identified by the respective carrier frequencies $f_1$ and $f_2$:

$$\left\{ \frac{|\hat{a}_1^{(1)}(f_1)|^2}{|\hat{a}_2^{(1)}(f_1)|^2} > R \text{ and } \frac{|\hat{a}_2^{(2)}(f_1)|^2}{|\hat{a}_1^{(2)}(f_1)|^2} > R \right\} \text{ and}$$

$$\left\{ \frac{|\hat{a}_2^{(1)}(f_2)|^2}{|\hat{a}_1^{(1)}(f_2)|^2} > R \text{ and } \frac{|\hat{a}_1^{(2)}(f_2)|^2}{|\hat{a}_2^{(2)}(f_2)|^2} > R \right\}.$$

The condition in the first parenthesis shows that, within the band $f_1$, the first eigenvector features higher average-power delivered to port 1 than to port 2, while the opposite is true for the second eigenvector. The condition in the second parenthesis shows that, within the band $f_2$, the first eigenvector features higher power delivered to port 2 than to port 1, while the opposite is true for the second eigenvector. The imbalance between the magnitude of the eigenvector components is exploited by having a higher-power RF amplifier operate on the higher-weight eigenvector components, and a lower-power RF amplifier operate on the lower-weight eigenvector components, within each band. The "switched multiplexer" device 606, for which one possible implementation is described in FIG. 7, separates the amplified signals in the frequency domain (assuming $f_1 < f_2$) and sends them to the appropriate port of the multi-port antenna. In the implementation of FIG. 7, signal filtering, routing and combining is performed within a switched multiplexer 710 through a programmable switch matrix 708 whose operation is effected through a CONTROL signal. For simplicity, the foregoing condition assumes that all signals have unitary maximum average-power level even though it is typically different in each band, and employs the same ratio R for all eigenvectors even though in general the ratio may be different for each eigenvector, requiring, in such more general cases, straightforward modifications to the stated condition. The ratio R is greater, and should possibly be significantly greater, than unity. For instance, a ratio R greater than 2 is achievable with only a ratio greater than 1.42 between $|\hat{a}_1^{(1)}(f_1)|$ and $|\hat{a}_2^{(1)}(f_1)|$, $|\hat{a}_2^{(2)}(f_1)|$ and $|\hat{a}_1^{(2)}(f_1)|$, $|\hat{a}_2^{(1)}(f_2)|$ and $|\hat{a}_1^{(1)}(f_2)|$, $|\hat{a}_1^{(2)}(f_2)|$ and $|\hat{a}_1^{(2)}(f_2)|$, and would allow using a low-power amplifier 604 with half the power gain of the high-power amplifier 602 (for simplicity, amplifiers with flat gains versus frequency are assumed). According to this approach, the ratio R yields the ratio between the power gains of the amplifiers. Banks of low-pass filters (LPF) and high-pass filters (HPF) 706 are used to separate the signals in the frequency domain.

It is noteworthy that the architecture just described to enable transmit diversity in multiple bands can also be employed to realize the architecture of FIG. 5 to enable spatial multiplexing in MIMO antenna systems, by properly setting the programmable switch matrix 708 so as to combine the LPF output in the high-gain chain with the HPF output in the low-gain chain and send them to port 1, and combine the HPF output in the high-gain chain with the LPF output in the low-gain chain and send them to port 2.

Adaptivity

In real applications, the electromagnetic environment around the multi-port antenna can change continuously (for instance when the portable wireless device user is handling it), and so do the multi-port antenna scatting parameters. In all the foregoing implementations, the incident-wave eigenvectors can be defined adaptively based on real-time or periodical estimations of the multi-port antenna scattering parameters $S_{ij}$. FIG. 11 shows one possible architecture which allows the estimation of the magnitude and/or the phase of all or select scattering parameters for a two-port antenna characterized by a scattering matrix $[S(\tau)]$, which is a function of time $\tau$. In FIG. 11, elements 1134 provide estimates of the incident and reflected waves, $\tilde{a}_i(\tau)$ and $\tilde{b}_i(\tau)$ respectively, at each port of multi-port antenna 302. These estimates are processed in element 1136 yielding real-time estimates of the magnitude $|\tilde{S}_{ij}|(\tau)$ and/or the phase $\angle \tilde{S}_{ij}(\tau)$ of the antenna scattering parameters. The estimates of the scattering parameters can be performed through analog or digital means. For instance, elements 1134 could be bi-directional couplers while element 1136 could perform frequency down-conversion and measure magnitude and phase of each wave, which would be used to compute the real-time estimates of the scattering parameters magnitude and phase. Alternatively, the estimation of the scattering parameters could be performed digitally within element 1136, for instance by estimating the wave magnitudes while converting the digitally-modulated wave estimates $\tilde{a}_i(\tau)$, $\tilde{b}_i(\tau)$ to baseband to extract their information content, and using the synchronization and/or channel estimation bits embedded in the signal frame preambles to estimate the time-delays between waves, yielding their relative phase differences. Subsequently, element 1138 would employ the scattering parameter estimates to determine the correction required for the incident-wave eigenvectors and effect said correction through control signals $\gamma_i(\tau)$ applied to programmable transceivers 1132. Within element 1138, the reciprocity of the scattering matrix estimate can be enforced, if so desired, by enforcing that it be symmetric, for instance by averaging symmetrical off-diagonal scattering parameters.

If the dissipation matrix $[\underline{Q}_d]$ is chosen to define the incident-wave eigenvectors, the straightforward use of the scattering parameter estimates can be employed to compute a real-time estimate $[\underline{Q}_d(\tau)]$ of the dissipation matrix, its eigenvalues and eigenvectors, so that a correction to the incident-wave eigenvectors can be effected to achieve the desired performance, for instance, maximum efficiency.

There are cases where estimating the phase of the scattering parameters could be too onerous, from a cost, complexity, computational burden, and overall RF performance viewpoint. In these cases, sub-optimal real-time corrections of the incident-wave eigenvectors could be sought. One possible sub-optimal approach is represented by the correction of the magnitude of the scattering parameters. For instance, assuming that element 1136 outputs the magnitude estimates $|\tilde{S}_{ij}|(\tau)$ of all or select scattering parameters, these magnitudes could be employed to compute the current scattering matrix estimate $[\tilde{S}(\tau)]$ assuming the phases of all scattering parameters as well as the magnitudes of the scattering parameters for which an estimate is not available remained unaltered, yielding the corresponding real-time estimate $[\underline{Q}_d(\tau)]$ of the dissipation matrix, its eigenvalues and eigenvectors, so that a correction to the incident-wave eigenvectors can be effected through control signals $\gamma_i(\tau)$. Should estimating the phase be preferable to the estimation of the magnitude of the scattering parameters, then the current scattering matrix estimate can be computed by assuming that the magnitudes of the scattering parameters remain unaltered.

If the radiation matrix $[\underline{Q}_{rad}^\Psi]$, the real-power flow matrix $[\underline{Q}_S^\Psi]$, or the volumetric storage (or dissipation) matrix $[\underline{Q}_V^\Psi]$, is chosen to define the incident-wave eigenvectors, a straightforward link with the multi-port antenna scattering parameters is not readily available. Indeed, compensation for changes in the antenna response can be attempted if a sub-optimal mitigation of potential performance degradation is desirable. For instance, severe antenna detuning could in some cases alter substantially the net input power at select antenna ports, which in turn may distort significantly the desired field distributions corresponding to predetermined reference states. An example of a predetermined reference state is when the device incorporating the multi-port antenna is worn on the user's body. In these cases, it would be advantageous to rescale the incident-wave eigenvector components so the relative proportions of net input power into each port remains similar to the corresponding proportions in at least one of predetermined reference states used to determine the matrices $[\underline{Q}_{rad}^\Psi]$, $[\underline{Q}_S^\Psi]$, $[\underline{Q}_V^\Psi]$. So if a scattering matrix $[S]$ corresponding to a predetermined reference state is chosen to establish a reference condition, and $\underline{a}$ is the incident-wave vector, the net input power ($W_i$) into each port is expected to be $$W_i = \frac{1}{2}(a_i^* a_i - b_i^* b_i) = \frac{1}{2}\underline{a}^+ \cdot (\underline{\delta}_i \underline{\delta}_i^+ - \underline{S}_i^+ \underline{S}_i) \cdot \underline{a},$$

where $\underline{S}_i$ is the i-th row of [S], $\delta_i$ is the Kronecker unit-vector. The sequence $\{W_i\}$ so defined is the reference condition. When a real-time estimate $[\tilde{S}(\tau)]$ of the scattering matrix is available, an updated incident-wave vector (a') can be defined to yield the same net input power at the i-th port $$W_i = \frac{1}{2}\underline{a}'(\tau)^+ \cdot [\underline{\delta}_i \underline{\delta}_i^+ - \underline{\tilde{S}}_i^+(\tau)\underline{\tilde{S}}_i(\tau)] \cdot \underline{a}'(\tau) = \frac{1}{2}\underline{a}'(\tau)^+ \cdot [\underline{\tilde{q}}_i(\tau)] \cdot \underline{a}'(\tau).$$

Enforcing this condition at all ports may lead, for instance, to a least-squares solution for a' using standard algorithms to minimize the functional $$\Upsilon(\underline{a}) = \sum_i \left| W_i - \frac{1}{2}\underline{a}^+ \cdot [\underline{\tilde{q}}_i(\tau)] \cdot \underline{a} \right|^2.$$

In another embodiment, the matrix representation used to define the incident-wave eigenvector is selected adaptively based on the device awareness of the conditions in which it is being used. For instance, body-proximity sensors or equivalent means could be employed to determine whether a device is being worn at the user's body or whether is it away from it. Different representations of the multi-port antenna could be more suitable to enhance the communication performance in the two cases. Alternatively, a device incorporating the multi-port antenna could be used for different applications at different times, with different matrix representations being more suitable to enhance the communication performance in each application. Therefore, the architecture in FIG. 11 can be provided with a control signal $\zeta(\tau)$ which performs the selection of the desired matrix representation to be used by element 1138, according with the adaptive schemes illustrated in the foregoing, and to effect corresponding changes in the complex weights applied to the transmitted and received waves at the ports of the multi-port antenna through control signals $\gamma_i(\tau)$.

Furthermore, the matrix representation used to define the incident-wave eigenvector may be updated periodically or in real-time based on periodical or real-time updates of an applicable channel matrix $[\psi]$, for instance due to available updates at a time $\tau$ of the applicable spatial weighting function $w(x, y, z|\tau)$ or angular weighting function $w(\theta, \phi|\tau)$, which could be due, for example, to available updates of the set of tracked points $\{r_h \equiv (x_h, y_h, z_h)|\tau\}$ or the set of directions $\{(\theta_h, \phi_h)|\tau\}$, respectively. In this case, the control signal $\zeta(\tau)$ in the architecture in FIG. 11 provides all the required information, including for instance updates of the set of tracked points $\{r_h \equiv (x_h, y_h, z_h)|\tau\}$ or the set of directions $\{(\theta_h, \phi_h)|\tau\}$, needed by element 1138 to recompute the parameters of the applicable matrix representations and to effect corresponding changes in the complex weights applied to the transmitted and received waves at the ports of the multi-port antenna through control signals $\gamma_i(\tau)$.

Accordingly, there has been provided a MIMO antenna system that enhances the system performance in terms of range and capacity, thereby enhancing system reliability and consumer experience. Portable radios, mobile phones, and fixed installation communications products can all benefit from the MIMO antenna system formed and operating in accordance with the various embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A multi-port antenna system, comprising:
    a multi-port antenna;
    a multi-port active feeding network coupled to the multi-port antenna, the active feeding network applying, at each operating frequency, incident-wave eigenvector excitation signals corresponding to a Hermitian matrix representation of the multi-port antenna; and
    wherein the Hermitian matrix representation is derived from predetermined multi-port antenna parameters; and
    wherein the Hermitian matrix representation yields orthogonal electromagnetic fields in volumes or surfaces of predetermined interest.

2. The multi-port antenna system of claim 1, wherein the predetermined multi-port antenna parameters comprise at least one of:
    scattering parameters based on incident and reflected waves at the ports of the multi-port antenna;
    power radiation at a surface at infinity;
    real-power flow through an arbitrary surface;
    volumetric energy storage in an arbitrary volume;
    volumetric energy dissipation in an arbitrary volume.

3. The multi-port antenna system of claim 1, wherein
    the Hermitian matrix representation comprises a dissipation matrix, derived from the scattering matrix of the multi-port antenna; and
    the Hermitian matrix provides eigenvectors which yield the incident-wave antenna excitation signals, the eigenvectors having corresponding eigenvalues, the incident-wave antenna signals having an efficiency based on the corresponding eigenvalues, and the eigenvectors producing radiated eigenfields which are orthogonal when the multi-port antenna is lossless.

4. The multi-port antenna system of claim 1, wherein the Hermitian matrix representation comprises:
    a radiation matrix derived from radiated fields of the multi-port antenna, the radiation matrix providing the incident-wave eigenvector excitation signals, the incident-wave antenna eigenvector excitation signals having an efficiency provided by eigenvalues corresponding to the incident-wave eigenvector excitation signals, and whose radiated eigenfields are orthogonal on a surface at infinity.

5. The multi-port antenna system of claim 4, wherein the Hermitian matrix representation of the multi-port antenna further comprises a Hermitian channel matrix expressing a dependency on a propagation channel, field polarization, and observation angles.

6. The multi-port antenna system of claim 5, wherein the Hermitian channel matrix is defined through a dyad.

7. The multi-port antenna system of claim 1, wherein the Hermitian matrix representation comprises a real-power flow matrix; and
    wherein the real-power flow matrix is derived from the electromagnetic fields of the multi-port antenna over a surface of interest, the real-power flow matrix having eigenvectors which yield the incident-wave antenna excitation signals with an efficiency provided by eigenvalues corresponding to the eigenvectors, and whose eigenfields are orthogonal over a surface of interest.

8. The multi-port antenna system of claim 7, wherein the Hermitian matrix representation of the multi-port antenna applied by the feeding network comprises a Hermitian channel matrix expressing a dependency on a propagation channel, a field polarization, and spatial weighting.

9. The multi-port antenna system of claim 8, wherein the Hermitian channel matrix is defined through a dyad.

10. The multi-port antenna system of claim 1, wherein the Hermitian matrix representation comprises one of: a volumetric storage matrix and a dissipation matrix; and
    wherein the volumetric storage matrix and dissipation matrix are derived from the electromagnetic fields of the multi-port antenna over a volume of interest, the volumetric storage matrix and the dissipation matrix having eigenvectors which yield the incident-wave antenna excitation signals with an efficiency provided by eigenvalues corresponding to the eigenvectors, and whose eigenfields are orthogonal over a volume of interest.

11. The multi-port antenna system of claim 10, wherein the Hermitian matrix representation comprises a Hermitian channel matrix expressing a dependency on a propagation channel, a field polarization, and spatial weighting.

12. The multi-port antenna system of claim 11, where the Hermitian channel matrix is defined through a dyad.

13. The multi-port antenna system of claim 1, wherein the multi-port antenna comprises scattering parameters, and the Hermitian matrix representation includes eigenvalues and eigenvectors computed periodically or in real-time based on periodical or real-time estimations of the multi-port antenna scattering parameters.

14. The multi-port antenna system of claim 1, wherein the Hermitian matrix representation includes eigenvalues and eigenvectors computed periodically or in real-time based on information relative to a propagation channel as made available by a communication infrastructure in which devices incorporating the multi-port antenna operate.

15. A multi-port antenna system, comprising:
    a multi-port antenna;
    an active feeding network coupled to the multi-port antenna, the active feeding network having transmitters and receivers for transmitting and receiving excitation signals; and
    the active feeding network applying complex weights to signals received from and transmitted to each port of the multi-port antenna, the complex weights being applied according to eigenvectors corresponding to a Hermitian matrix representation of the multi-port antenna, the Hermitian matrix being related to at least one of: power dissipation, power radiation, real-power flow, volumetric storage of electromagnetic energy, volumetric dissipation of electromagnetic energy; and
    the multi-port antenna yielding orthogonal electromagnetic fields in volumes or surfaces of interest in response to the active feeding network excitation signals.

16. The multi-port antenna system of claim 15, wherein the active feeding network comprises waveform generators, distributed amplifiers featuring multiple programmable amplifying stages with programmable gains and programmable delay lines which together realize an impressed-wave vector and scattering matrix used to excite predetermined incident-wave eigenvectors at the ports of the multi-port antenna.

17. The multi-port antenna system of claim 15, wherein the number of actively fed ports of the multi-port antenna is less than the total number of its ports, wherein each port is loaded with impedances that yield reflection coefficients that produce predetermined incident-wave eigenvectors.

18. The multi-port antenna system of claim 15, wherein the active feeding network realizes a spatial multiplexing function by applying complex weights to multiple uncorrelated waveforms being transmitted or received simultaneously at all ports of the multi-port antenna, wherein the weight applied to each waveform is a component of a predetermined eigenvector.

19. The multi-port antenna system of claim 18, wherein the active feeding network comprises amplifiers with different gains, each amplifier being selected to amplify predetermined eigenvector components depending on the components' relative weight, the amplified eigenvector components being generated at different frequencies separated in frequency and combined for routing to predetermined ports of the multi-port antenna.

20. The multi-port antenna system of claim 15, wherein the active feeding network provides transmit and receive diversity by selecting different eigenvectors at different times to weight the transmit or receive signals applied or received at the ports of the multi-port antenna, wherein the weight applied to the signal transmitted or received at each port is a component of a selected eigenvector.

21. The multi-port antenna system of claim 20,
wherein the active feeding network comprises amplifiers with different gains, each amplifier being selected to amplify predetermined eigenvector components depending on the components' relative weight; and
wherein the amplified eigenvector components at different frequencies are separated in frequency and routed to ports of the multi-port antenna through a switch matrix.

22. The multi-port antenna system of claim 15, wherein the multi-port antenna comprises scattering parameters and the Hermitian matrix comprises eigenvectors and eigenvalues; and
wherein the active feeding network utilizes periodical or real-time estimation of predetermined magnitudes and predetermined phases of the scattering parameters to re-compute the eigenvalues and eigenvectors of the Hermitian matrix representation, the re-computed eigenvalues and eigenvectors being used to update the complex weights applied to the transmit or received signals.

23. The multi-port antenna system of claim 15, wherein the multi-port antenna comprises scattering parameters and the Hermitian matrix representation comprises eigenvectors and eigenvalues: and the Hermitian matrix representation being chosen periodically among Hermitian matrix representations derived from at least one of:
scattering parameters based on incident and reflected waves at the ports of the multi-port antenna;
power radiation at a surface at infinity;
real-power flow through an arbitrary surface;
volumetric energy storage in an arbitrary volume;
volumetric energy dissipation in an arbitrary volume; and
wherein the active feeding network utilizes periodical or real-time selection of the Hermitian matrix representation used to re-compute the eigenvalues and eigenvectors of the Hermitian matrix representation, the re-computed eigenvalues and eigenvectors being used to update the complex weights applied to the transmit or received signals.

24. The multi-port antenna system of claim 23, wherein the complex eigenvector weights are re-computed to approximate the net input power at each port of the multi-port antenna based on a predetermined reference condition comprising the multi-port antenna structure in a predetermined reference state.

25. A communication system, comprising:
a communication device operating within a communication infrastructure;
a multi-port antenna coupled to the communication device;
an active feeding network coupled to at least one port of the multi-port antenna; and the active feeding network applying excitation signals to the at least one port, the excitation signals being eigenvector excitation signals corresponding to a Hermitian matrix representation of the multi-port antenna, the eigenvector excitation signals being applied to control the multi-port antenna efficiency; and
wherein the Hermitian matrix representation yields orthogonal electromagnetic fields.

26. The communication system of claim 25, wherein the Hermitian representation of the multi-port antenna yields the orthogonal electromagnetic fields in response to the active feeding network eigenvector excitation signals.

27. The communication system of claim 25, wherein the Hermitian matrix representation is derived from predetermined multi-port antenna parameters of the multi-port antenna.

28. The communication system of claim 27, wherein the predetermined multi-port antenna parameters comprise at least one of:
scattering parameters based on incident and reflected waves at the ports of the multi-port antenna;
power radiation at a surface at infinity;
real-power flow through an arbitrary surface;
volumetric energy storage in an arbitrary volume;
volumetric energy dissipation in an arbitrary volume.

29. The communication system of claim 25, wherein the Hermitian matrix representation of the multi-port antenna comprises:
a Hermitian channel matrix, the Hermitian channel matrix being dependent on coordinates of the communication device incorporating the multi-port antenna as well as coordinates of other communication devices within the communication system.

30. The communication system of claim 29, wherein the Hermitian channel matrix is updated to reflect changes in the coordinates of the communication device incorporating the multi-port antenna and the coordinates of the other communication devices within the communication system.

31. The communication system of claim 25, wherein the Hermitian matrix representation yields the orthogonal electromagnetic fields in volumes or surfaces of predetermined interest.

* * * * *